US012786645B2

(12) United States Patent
von Tessin et al.

(10) Patent No.: US 12,786,645 B2
(45) Date of Patent: Nov. 3, 2026

(54) METHOD AND SYSTEM FOR COLLECTING USAGE DATA OF HEARING DEVICES

(71) Applicant: SONOVA AG, Staefa (CH)

(72) Inventors: Michael von Tessin, Esslingen (CH); Filip Wojcieszyn, Stäfa (CH); Franz Schnyder, Jona (CH); Alexander Maksyagin, Ebmatingen (CH)

(73) Assignee: Sonova AG, Staefa (CH)

( * ) Notice: Subject to any disclaimer, the term of this patent is extended or adjusted under 35 U.S.C. 154(b) by 183 days.

(21) Appl. No.: 18/617,146

(22) Filed: Mar. 26, 2024

(65) Prior Publication Data

US 2024/0334143 A1 Oct. 3, 2024

(30) Foreign Application Priority Data

Mar. 28, 2023 (EP) .................................... 23164668

(51) Int. Cl.
*H04R 29/00* (2006.01)
*H04L 9/14* (2006.01)
*H04L 9/32* (2006.01)

(52) U.S. Cl.
CPC ............... *H04R 29/00* (2013.01); *H04L 9/14* (2013.01); *H04L 9/3247* (2013.01)

(58) Field of Classification Search
CPC .... H04R 29/00; H04R 1/1091; H04R 25/558; H04R 2225/39; H04R 2225/55;
(Continued)

(56) References Cited

U.S. PATENT DOCUMENTS 4,972,487 A * 11/1990 Mangold .............. H04R 25/505
381/314
8,059,825 B2 * 11/2011 Latzel .................... H04R 25/70
381/23.1
(Continued)

FOREIGN PATENT DOCUMENTS

| | | | |
|---|---|---|---|
| EP | 3113514 | A1 | 1/2017 |
| EP | 3236674 | A1 | 10/2017 |
| WO | 2021016099 | A1 | 1/2021 |

OTHER PUBLICATIONS

European Search Report and Written Opinion received Sep. 12, 2023 in International Application No. EP23164668.8.

*Primary Examiner* — Akelaw Teshale
(74) *Attorney, Agent, or Firm* — ALG Intellectual Property, LLC

(57) ABSTRACT

A method includes providing a hearing device with a key, which is a secret asymmetric private key or a secret shared symmetric key, and storing the key on the hearing device; logging data related to a usage of the hearing device and storing the logged usage data on the hearing device; signing the stored logged usage data, using the key stored on the hearing device; transmitting the signed stored logged usage data from the hearing device to a data lake separate from the hearing device; verifying the signature of the signed logged usage data received from the hearing device by using the public key that corresponds to the private key stored on the hearing device or by using a secret shared symmetric key corresponding to the shared secret symmetric key stored on the hearing device; and, if the signature is verified, processing the signed logged usage data.

15 Claims, 2 Drawing Sheets

(58) Field of Classification Search
CPC ..... H04R 2420/07; H04R 25/554; H04L 9/14; H04L 9/3247; H04L 9/0894; H04L 9/3263; G06F 21/606; G06F 21/64; G16H 40/63; H04W 12/069
See application file for complete search history.

(56) References Cited

U.S. PATENT DOCUMENTS

| | | | | |
|---|---|---|---|---|
| 8,406,440 | B2 * | 3/2013 | Kidmose | H04R 25/305 381/314 |
| 10,404,472 | B2 * | 9/2019 | Knopf | H04L 9/088 |
| 10,916,245 | B2 * | 2/2021 | Kwatra | G06N 20/00 |
| 10,993,051 | B2 * | 4/2021 | Xu | H04R 25/507 |
| 11,062,012 | B2 * | 7/2021 | Pedersen | G06F 21/445 |
| 11,153,699 | B2 * | 10/2021 | Westergaard | H04R 25/70 |
| 11,182,491 | B2 * | 11/2021 | Goldsteen | H04L 9/30 |
| 2007/0036280 | A1 * | 2/2007 | Roeck | H04R 25/558 379/52 |
| 2007/0223753 | A1 * | 9/2007 | Latzel | H04R 25/552 381/315 |
| 2008/0260190 | A1 * | 10/2008 | Kidmose | H04R 25/305 381/314 |
| 2010/0002887 | A1 * | 1/2010 | Roeck | H04R 25/552 381/23.1 |
| 2010/0104122 | A1 * | 4/2010 | Waldmann | H04R 25/70 381/314 |
| 2014/0193007 | A1 * | 7/2014 | Solum | H04W 4/023 381/313 |
| 2017/0085539 | A1 | 3/2017 | Wishard et al. | |
| 2017/0324564 | A1 * | 11/2017 | Knopf | H04L 9/14 |
| 2019/0379644 | A1 * | 12/2019 | Schneider | H04L 9/0894 |
| 2020/0066264 | A1 * | 2/2020 | Kwatra | G10L 25/63 |
| 2020/0100038 | A1 * | 3/2020 | Westergaard | H04R 25/70 |
| 2021/0266102 | A1 * | 8/2021 | Ferrari | H04L 1/0076 |
| 2021/0306771 | A1 * | 9/2021 | El Guindi | A61B 5/01 |
| 2022/0392286 | A1 | 12/2022 | Elrad et al. | |

* cited by examiner

METHOD AND SYSTEM FOR COLLECTING USAGE DATA OF HEARING DEVICES

RELATED APPLICATIONS

The present application claims priority to EP patent application Ser. No. 23/164,668.8, filed Mar. 28, 2023, the contents of which are hereby incorporated by reference in their entirety.

BACKGROUND INFORMATION

Manufacturers of hearing devices are interested in knowing how their hearing devices are used in the field. For this purpose, hearing devices usually are able to log data about how they are used. Analysis of logged usage data by the manufacturer may help, for example, in making strategic decisions about marketing, product improvements, etc.

Since the logged usage data have to be transferred from the hearing devices to the manufacturer, the transfer path may be attacked by an attacker, resulting in corrupted or faked data being received by the manufacturer, what may have a negative impact on the reliability of the results of the analysis of the logged usage data.

EP 3 236 674 A1 relates to a hearing device employing a Trusted Platform Module (TPM) which allows the hearing device to be used for cryptographic signatures based on a private key or a symmetric key kept on the hearing device, wherein the manufacturer of the hearing device may act as a certification instance. Logged data, including hearing device sensor data, may be safely stored in a protected memory of the TPM module or may be safely outsourced on an external device, such as a smartphone or a cloud server, after having been signed by an outsourcing key. Health data collected by the hearing device may be supplied to a physician after having been encrypted and signed.

WO 2021/016099 A1 relates to the pairing of a hearing device with a communication device, wherein a Bluetooth Low Energy (BLE)-specific Connection Signature Resolving Key (CSRK) is used to sign and verify data that is sent across a BLE connection with the communication device, and wherein the signature is verified by the receiving communication device.

US 2017/085539 A1 relates to autonomous sensor systems for industrial applications with intrinsic asymmetric encryption wherein sensor data are encrypted via an asymmetric encryption processor, signed and transmitted to an authenticating device for authenticating the sensor data.

BRIEF DESCRIPTION OF THE DRAWINGS

Hereinafter, examples of the invention will be illustrated by reference to the attached drawings, wherein.

DETAILED DESCRIPTION

Figure 1:
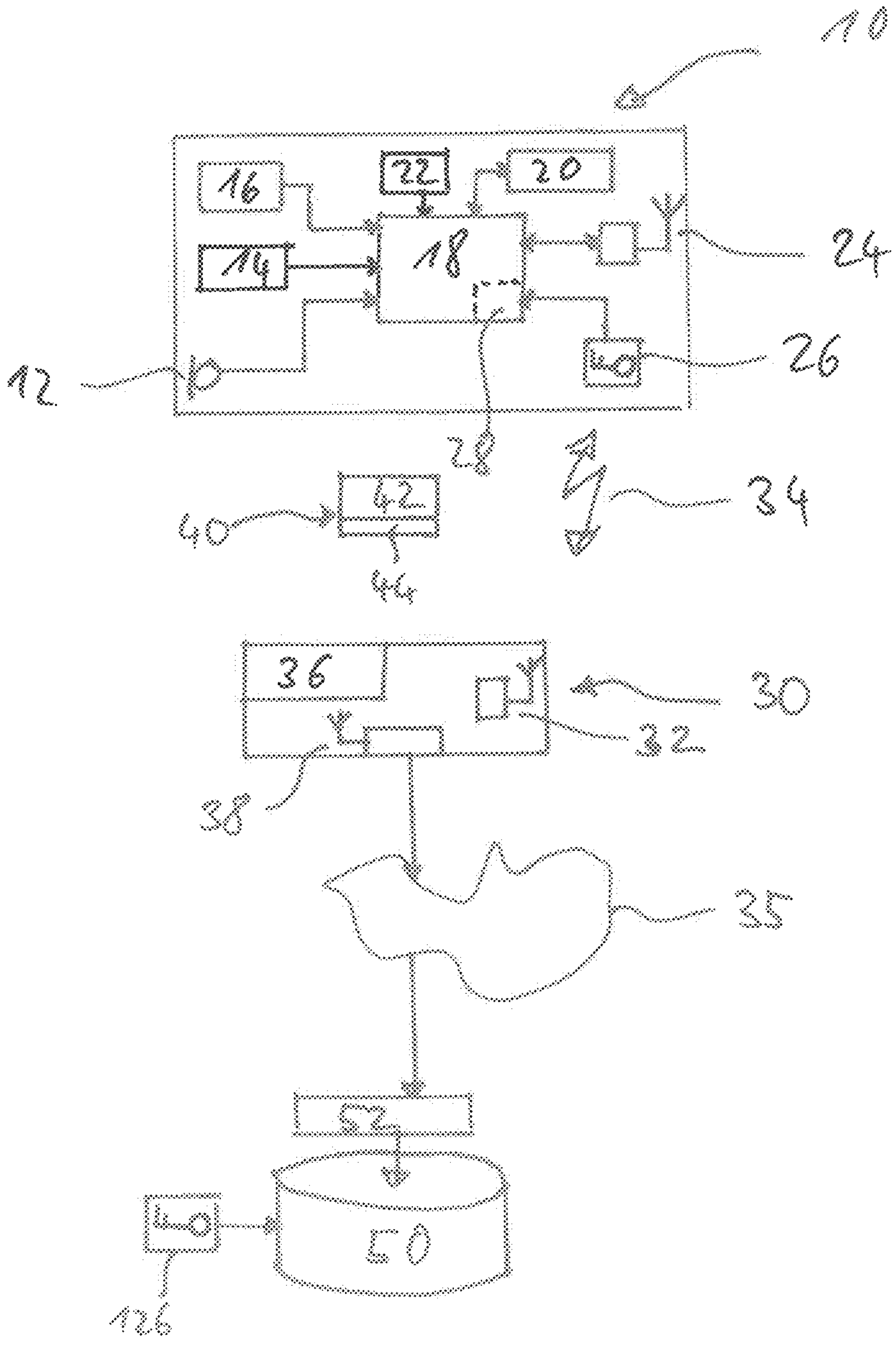
FIG. 1 is a schematic illustration of an example of a system for collecting usage data of a hearing device.

Described herein are a method and system for collecting usage data of hearing devices.

Embodiments described herein may provide for a method and system for collecting usage data of hearing devices which allows for a reliable external analysis of the collected usage data.

The features described herein are beneficial in that, by signing logged usage data, using a key stored on the hearing device before transmitting the signed stored logged usage data from the hearing device to a data lake separate from the hearing device and by verifying, e.g. by the data lake or by the operator of the data lake, the signature of signed logged usage data received from the hearing device prior to processing the logged usage data, poisoning of the data lake by unauthorized data, such as fake data from an attacker, can be prevented, thereby allowing for reliable results obtained by processing, e.g. by the data lake or by the operator of the data lake, data from the data lake, wherein the processing may include data mining.

According to one example, the logged usage data may include data of at least one sensor integrated within or connected to the hearing device. In particular, the at least one sensor may be a microphone, an accelerometer and/or a photoplethysmography (PPG) sensor.

According to one example, the logged usage data may include data concerning a user behavior, including at least one of usage times, usage durations, wearing times, wearing pattern, preferred user configurations of the hearing device and preferred programs of the hearing device.

According to one example, the data lake may be maintained and accessed by the manufacturer of the hearing device.

According to one example, the result of the processing of the verified signed logged usage data may be used for optimizing at least one of: the design and functionality of the hearing device, the default settings of the hearing device and the hearing programs of the hearing device. In particular, the data lake may comprise a general population data lake including logged usage data from a plurality of hearing devices stored in a non-device-specific manner, wherein the processing is performed on the data from the general population data lake.

According to one example, the result of the processing of the verified signed logged usage data is used for providing specific feedback to the user of the hearing device and/or to the hearing device. In particular, the data lake may comprise a device-specific data lake including logged usage data from the hearing device stored in a device-specific manner, wherein the processing is performed on the data from the device-specific data lake.

According to one example, the hearing device may sign, by using the key stored on the hearing device, not only the stored logged usage data but in addition also metadata associated with the stored logged usage data and may transmit the signed metadata, together with the signed stored logged usage data, to the data lake. In particular, the metadata may include at least one of a sequence number, a timestamp, a nonce and a user consent identifier, wherein the user consent identifier, for example, may be indicative of a permanent consent or of a limited consent including a consent expiration date.

According to one example, the signed stored logged usage data may be transmitted from the hearing device to the data lake via a channel using a Bluetooth protocol, a WiFi protocol and/or the internet.

According to one example, the signed stored logged usage data may be transmitted from the hearing device to the data lake by using at least one auxiliary device as a gateway. For example, the at least one auxiliary device may be a mobile phone, a tablet computer or a laptop computer of a user of the hearing device or a personal computer (PC) or laptop computer of a hearing care professional, wherein the at least one auxiliary device may be connected, for example, via an app to an online-service of the manufacturer.

According to one example, the signed stored logged usage data may be transmitted as non-encrypted data.

According to one example, the private key may be stored on the hearing device during production.

According to one example, the manufacturer of the hearing device may issue a certificate which contains at least the public key and a signature over the public key. In particular, the certificate may also contain an identity of the hearing device. For example, the certificate may be stored in a cloud and may be accessible at least by the manufacturer of the hearing device.

According to one example, the signature of the signed logged usage data received from the hearing device may be verified before the signed logged usage data is admitted to the data lake.

According to an alternative example, the signed logged usage data received from the hearing device may be admitted to the data lake without verifying the signature, wherein the signature of signed logged usage data may be verified when the signed logged usage data is retrieved from the data lake for processing.

According to one example, the stored logged usage data may be signed by calculating a MAC (message authentication code) for the stored logged usage data based on the secret shared symmetric key.

A "hearing device" as used hereinafter is any ear level element suitable for reproducing sound by stimulating a user's hearing, such as an electroacoustic hearing aid, a bone conduction hearing aid, an active hearing protection device, a hearing prostheses element such as a cochlear implant, a wireless headset, an earbud, an earplug, an earphone, etc.

A "data lake" as used hereinafter is a system or repository of data stored in its natural or raw format, usually object blobs or files (see, for example, "Wikipedia" (https://en.wikipedia.org/wiki/Data_lake)). A data lake is usually a single store of data including raw copies of source system data, sensor data, social data etc., and transformed data used for tasks such as reporting, visualization, advanced analytics and machine learning. A data lake can include structured data from relational databases (rows and columns), semi-structured data (CSV, logs, XML, JSON), unstructured data (emails, documents, PDFs) and binary data (images, audio, video). A data lake can be established "on premises" (within an organization's data centers) or "in the cloud" (using cloud services from vendors).

A data lake stores relational data from line of business applications, and non-relational data from mobile apps, IoT devices, and social media.

The concept of a data lake is associated with big data and analytics, where vast amounts of data are stored in their native format until needed. Unlike a hierarchical data warehouse, which stores data in files or folders, a data lake uses a flat architecture to store data. Each data element in a data lake is tagged with a set of extended metadata tags. When a business question arises, the data lake can be queried for relevant data, and that smaller set of data can then be analyzed to help answer the question.

In technical discussions, the term "data lake" implies scalability (to handle huge volume of data), flexibility (to store data in various formats (e.g., CSV, JSON, Parquet)), schema-on-read (unlike traditional databases that define the schema on write), cost-effectiveness (often built on low-cost hardware or cloud storage solutions) and integration (with various big data processing frameworks like Hadoop, Spark, etc.).

Many organizations across various industries implement data lakes as part of their data strategy, using technologies such as Amazon S3, Azure Data Lake Storage ("date lake" is also part of the "data lake" product from Microsoft), and Google Cloud Storage, among others.

"Data related to a use or usage of the hearing device" as used hereinafter, also used in abbreviated form as "usage data", includes all data that may be generated when a hearing device is used-in particular, worn-by a user, such as data provided by sensors included within or connected to the hearing device, such as a microphone, an accelerometer and/or a photoplethysmography (PPG) sensor, data concerning the user behavior like usage times, usage durations, wearing times, wearing pattern, preferred user configurations of the hearing device, etc., and data concerning device performance, such as software errors/crashes, network transmission errors, memory corruption, etc.

"Signing of data" as used hereinafter means that data is provided with a digital signature based on a specific key stored on the hearing device, which may be an asymmetric private key (as part of a public-private key pair) or a symmetric secret key (which is also known to the instance which verifies the signature). "Signing of data" refers to the process of appending a cryptographic token to a message or data, which primarily serves to verify the integrity and authenticity of the message and to also assert the identity of the sender. This process can be implemented using a symmetric cryptographic technique (using a shared key) (then sometimes also called "message authentication code") or an asymmetric cryptographic technique (using a private key) (then sometimes also called "digital signature"). The data as such is not encrypted by the signature; rather, the data may remain non-encrypted after signing, or it may be encrypted, in addition to the signature. While on the one hand encryption of the data in principle may enhance safety of the data transmission, data encryption, on the other hand, requires additional resources, in particular concerning computational effort, what may be non-desirable in view of the limited resources offered by small devices like hearing devices. Thus, if encryption is used, it may be limited, for example, to that data which necessarily has to remain confidential.

A "general population data lake" as used hereinafter is a data lake or part of a data lake wherein the received logged usage data is anonymized and not linkable to the individual source hearing devices. This allows for performing data analysis and processing over all devices. In this case the data lake does not require an identity of the hearing device.

"Storing data in a non-device specific manner" as used hereinafter accordingly means that received logged usage data is anonymized and hence is stored in a way that it is not linkable to the individual source hearing devices.

A "device-specific data lake" as used hereinafter is a data lake or part of a data lake wherein the received logged usage data is verifiably linked to an individual source hearing device. This requires that the data lake is made aware of the identity of the respective hearing device.

"Storing data in a device-specific manner" as used hereinafter accordingly means that received logged usage data is stored in a way that it is not linkable to the individual source hearing devices.

Accordingly, the concepts of "general population data lake" and "device-specific data lake" distinguish two use cases, namely (1) general transmission of data from a hearing device to the data lake for performing data analysis and processing over all devices, and (2) collecting specific data from a single hearing device and doing that only for the scope of a single, verified and identified hearing device.

"Data mining" as used hereinafter relates to a process of extracting and discovering patterns in large data sets involving methods at the intersection of machine learning, statistics, and database systems. A difference between data analysis and data mining is that data analysis is used to test models and hypotheses on the dataset, e.g., analyzing the effectiveness of a marketing campaign, regardless of the amount of data, whereas data mining uses machine learning and statistical models to uncover clandestine or hidden patterns in a large volume of data.

An example of a system for collecting usage data of a hearing device is schematically illustrated in FIG. 1, which comprises a hearing device 10, an auxiliary device 30 and a data lake storage medium 50.

The hearing device 10 comprises a plurality of sensors, such as a microphone 12, an accelerometer 14 and a PPG sensor 16, which may be integrated within the hearing device or which may be external sensors connected to the hearing device 10, a processing unit 18, a memory 20, a clock 22, a wireless interface 24, such as a Bluetooth interface, a key 26 stored on the hearing device 10 and a signature unit 28 for signing data provided by the hearing device 10 and metadata related to the hearing device 10.

The key 26 may be the secret private key of a private/public key pair or it may be a shared secret symmetric key.

For example, when the key 26 is a private key, a private/public key pair may be generated during production for each hearing device 10 by the manufacturer, wherein the manufacturer issues a certificate to each produced hearing device which contains at least the public key and a signature over it; the certificate may optionally also contain an identity of the hearing device 10. The certificate may be stored in a cloud and may be accessible at least by the manufacturer. The hearing device 10 stores the private key 26 persistently and securely in its memory 20 such that it cannot be extracted from the hearing device 10.

Also when the key 26 is a symmetric key, it may be generated by the manufacturer and stored on the hearing device 10 during manufacturing, so the manufacturer is aware of the symmetric shared as a secret between the hearing device 10 and the manufacturer.

From a use case perspective, the identity of hearing device is optional, because for the sake of analytics one may be rather interested in global trends over a population of devices than in data from a singled-out device (in this case it is sufficient to store the usage data in a non-device specific manner). Furthermore, in some contexts, one may on purpose want to remove any identity information for data privacy reasons.

During usage of the hearing device 10 by a user, in particular when the hearing device is worn by the user, the hearing device logs data related to the use of the hearing device 10 and stores the logged usage data in the memory 20 of the hearing device 10. Such logged usage data may include data generated by the sensors 12, 14, 16. For example, the audio signals captured by the microphone 12 is indicative of environmental sounds, the accelerometer data may be indicative of user activity, and the PPG sensor data may be indicative of health conditions of the user, such as heart rate and blood pressure. Further, the logged usage data may include data concerning the user behavior, like usage times, usage durations, wearing times, wearing pattern, preferred user configurations and programs of the hearing device 10, etc., and data concerning device performance, such as software errors/crashes (exceptional processing states), network transmission errors, memory corruption, etc.

The stored logged usage data (indicated at 42 in FIG. 1) are signed by the signature unit 28, using the key 26 stored on the hearing device 10 (the signature unit 28 may be a software or hardware module). For example, the logged usage data 42 may be signed with the key 26 when it is a private key (such signature is indicated at 44 in FIG. 1, with logged usage data 42 and the signature 44 together forming a data block 40). Alternatively, when the key 26 is a shared symmetric key, a MAC (Message Authentication Code) may be calculated for the logged usage data 42 based on the shared symmetric key. It is noted that the signing of the data 42 data does not require that the data 42 is encrypted by the signature/key; rather, the data 42 may remain non-encrypted after signing.

The signing process may happen immediately after having logged the respective usage data on the hearing device 10, but it also may happen at any time later (e.g. if the hearing device is offline) before sending out the logged usage data.

In addition to the logged usage data the hearing device 10 also may sign in the same way, by using the key 26 stored on the hearing device, metadata associated with the logged usage data, such as sequence numbers, timestamps and user consent identifiers related to the logged usage data. The user consent identifier may be indicative of a permanent consent (e.g., to use the logged usage data in a specific way for external analysis), or it may be indicative of a limited consent, including a consent expiration date (e.g. one year). Thus, the data block indicated at 42 in FIG. 1 may comprise not only logged usage data but also respective metadata.

After signing, the signed stored logged usage data, eventually including signed metadata, (block 40 in FIG. 1) may be transmitted from the hearing device 10 to data lake 50 for being later analyzed. For example, the data lake 50 may be maintained and accessed by the manufacturer of the hearing device 10.

Such transmission may occur via a channel using, for example, a Bluetooth protocol, a WiFi protocol and/or the internet; in particular, at least one auxiliary device 30 may be used as a gateway for such transmission. In the example illustrated in FIG. 1, an auxiliary device 30, such as a mobile phone, is utilized as a relay device which may be connected, e.g., via a respective app provided by the manufacturer of the hearing device 10, to an online-service 52 of the manufacturer, using a communication network 35, such as the internet.

The auxiliary device 30 may comprise a first wireless interface 32 (such as a Bluetooth interface) compatible with the wireless interface 24 of the hearing device 10 so as to establish a wireless link 34 between the hearing device 10 and the auxiliary device 30 for transmitting the block 40 with the signed logged usage data 42 (optionally together with metadata) to the auxiliary device 30. The auxiliary device 30 may comprise a user interface 36 and a second wireless interface 38 (such as a WiFi interface) for connecting the auxiliary device 30 with the communication network 35, allowing to transmit the data block 40 to the online service 52. In some cases, the first and second wireless interfaces may be the same, i.e., they may be realized by a single wireless interface. In other embodiments, the hearing device 10 may be directly connected to the wide-area network such as the internet, e.g. using wireless data transmission technologies such as 5G. For example, the auxiliary device 30 may be a mobile phone, a tablet computer or a laptop computer of a user of the hearing device or a PC or laptop computer of a hearing care professional, and wherein the auxiliary device may be connected, e.g. via an app, to an online-service of the manufacturer.

The online service 52 allows ingesting the logged usage data 42 (optionally together with metadata) into a data lake 50 from which the data may be retrieved for processing e.g. by the data lake or by operator of the data lake, e.g. the manufacturer. Prior to the processing of the data received from the hearing device 10, the signature 44 of data 42 received from the hearing device 10 is verified by the operator of the data lake (e.g., the manufacturer). Such verification of the origin and integrity of the data may happen already before the received data 42 is admitted to the data lake 50, i.e., at the time when the data 42 is received by the online service 52, or it may happen later when the respective data is retrieved from the data lake 50 for the processing.

For the verification of the signature associated with the data 42 received from the hearing device 10, the data lake or the operator of the data lake (e.g. the manufacturer) uses the respective counterpart 126 of the key 26 of the hearing device, i.e., the respective shared symmetric key or the respective public key (e.g. obtained from the hearing device certificate). It is noted that for such verification only a single key pair (for asymmetric keys) or a single shared symmetric key is required for the operator of the data lake.

Such verification/authentication of the data received from hearing device can prevent poisoning of the data lake by unauthorized data, such as fake data from an attacker, thereby allowing for reliable results obtained by processing the data from the data lake.

In particular, an attacker can be prevented both from injecting fake data, e.g., advertently misleading fake data, into the data lake 50, and from injecting logged use data modified during transmission even when the attacker can fully control the data transmission channel from the hearing device 10 to the data lake 50.

An attacker having control of the data transmission channel from the hearing device 10 to the data lake 50 could also replay or resubmit the signed data over and over, resulting in unauthorized data duplication in the data lake. Such attacks can be thwarted by detecting the resubmitted data using known cryptographic techniques, e.g., based on counters, nonces, timestamps or a combination thereof sent as part of the metadata. If the uniqueness of a data submission transaction cannot be verified, the data is not admitted into the data lake.

When processing the data in the data lake 50 received from the hearing device 10, the data may be mined and interpreted in order to, e.g. help making strategic decisions about marketing, product improvements, etc., such as to optimize the design of the hearing device, the default settings of the hearing device and/or the hearing programs of the hearing device. To this end, the data lake 50 may comprise a general population data lake which collects logged usage data and related metadata from a plurality of hearing devices stored in a non-device-specific manner, wherein the analysis regarding such strategic decisions may be based on the data from the general population data lake.

Further, the result of the processing of the data in the data lake may be used for providing specific feedback to the user of the hearing device 10. To this end, the data lake 50 may comprise a device-specific data lake including logged usage data and related metadata from the hearing device 10 stored in a device-specific manner, wherein the analysis regarding such device-specific feedback is based on the data from the device-specific data lake. In such device-specific data lake single hearing device data is collected separately from data from other hearing devices, so as to feedback improved settings for that specific product instance only, for example based on individual usage patterns.

Figure 2:
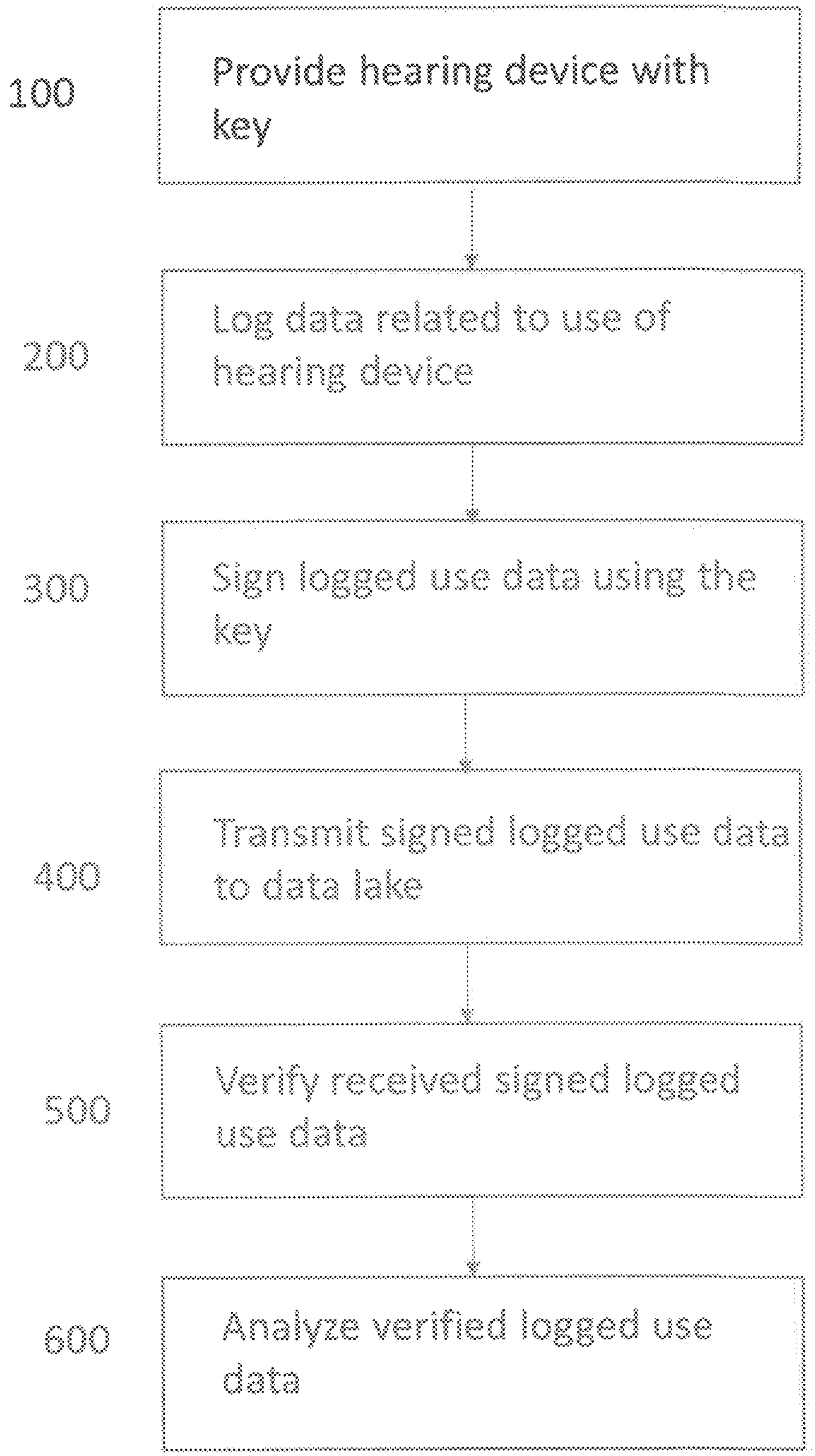
FIG. 2 is a flow diagram of an example of a method for collecting usage data of a hearing device.

An example of a flow diagram of a method is shown in FIG. 2.

In step 100 the hearing device is provided with a key which may be a secret asymmetric private key or a secret shared symmetric key and which is stored on the hearing device.

In step 200 data related to a use of the hearing device are logged and on the hearing device.

In step 300 the stored logged usage data is signed, using the key stored on the hearing device.

In step 400 the signed stored logged usage data is transmitted from the hearing device to a data lake separate from the hearing device.

In step 500 the signature of the signed logged usage data received from the hearing device is verified, e.g., by the operator of the data lake, by using the public key obtained from the hearing device certificate that corresponds to the private key or by using the shared secret symmetric key of the hearing device.

In step 600 the verified signed logged usage data of the data lake is processed, e.g. by the operator of the data lake, wherein the processing may include data mining.

The features described herein may prevent attackers from injecting fake data or modifying data in transit, thereby polluting the data in the data lake, even if the attacker has full control over all communication between the hearing device and the data lake, without a need to encrypt the data.

A major benefit is that the origin of hearing device logged data can always be verified in any part of the system. Such verification is the base to "trust" the logged data and build improvement feedback loops to the market with such data. This allows building features that learn from their usage and can be improved with hearing device-specific or general population logged data. Verification is even more relevant if a system is built that implements such improvement on itself as the system itself can ensure the data it uses to learn and improve is genuine. This also may form the basis for many features using artificial intelligence that rely on genuine learning data from a hearing device.

What is claimed is:

1. A method of collecting usage data of hearing devices, comprising providing a hearing device with a key, which is a secret asymmetric private key or a secret shared symmetric key, and storing the key on the hearing device;

logging data related to a usage of the hearing device and storing the logged usage data on the hearing device;

signing the stored logged usage data, using the key stored on the hearing device;

transmitting the signed stored logged usage data from the hearing device to a data lake separate from the hearing device;

verifying a signature of the signed logged usage data received from the hearing device by using a public key that corresponds to the private key stored on the hearing device or by using a secret shared symmetric key corresponding to the shared secret symmetric key stored on the hearing device; and if the signature is verified, processing the signed logged usage data.

2. The method of claim 1, wherein the logged usage data includes data of at least one sensor integrated within or connected to the hearing device, and wherein the at least one sensor is includes at least one of a microphone, an accelerometer, or a photoplethysmography sensor.

3. The method of claim 2, wherein the logged usage data includes data concerning a user behavior, including at least one of usage times, usage durations, wearing times, wearing pattern, preferred user configurations of the hearing device, or preferred programs of the hearing device.

4. The method of claim 1, wherein a result of the processing of the verified signed logged usage data is used for optimizing at least one of: a design and functionality of the hearing device, default settings of the hearing device, or hearing programs of the hearing device.

5. The method of claim 4, wherein the data lake comprises a general population data lake including logged usage data from a plurality of hearing devices stored in a non-device-specific manner, and wherein the processing is performed on the data from the general population data lake.

6. The method of claim 1, wherein a result of the processing of the verified signed logged usage data is used for providing specific feedback to at least one of a user of the hearing device or the hearing device.

7. The method of claim 6, wherein the data lake comprises a device-specific data lake including logged usage data from the hearing device stored in a device-specific manner, and wherein the processing is performed on the data from the device-specific data lake.

8. The method of claim 1, wherein the hearing device signs, by using the key stored on the hearing device, not only the stored logged usage data but in addition also metadata associated with the stored logged usage data and transmits the signed metadata, together with the signed stored logged usage data, to the data lake.

9. The method of claim 8, wherein the metadata includes at least one of a sequence number, a timestamp, a nonce, or a user consent identifier which is indicative of a permanent consent or of a limited consent including a consent expiration date.

10. The method of claim 1, wherein the signed stored logged usage data is transmitted from the hearing device to the data lake by using at least one auxiliary device as a gateway, wherein the at least one auxiliary device is a mobile phone, a tablet computer or a laptop computer of a user of the hearing device or a PC or laptop computer of a hearing care professional, and wherein the at least one auxiliary device is connected via an app to an online-service of a manufacturer.

11. The method of claim 1, wherein the signed stored logged usage data is transmitted as non-encrypted data.

12. The method of claim 1, wherein the private key is stored on the hearing device during production.

13. The method of claim 1, wherein a manufacturer of the hearing device issues a certificate which contains at least the public key and a signature over the public key and optionally also an identity of the hearing device.

14. The method of claim 1, wherein the signature of the signed logged usage data received from the hearing device is verified before the signed logged usage data is admitted to the data lake, or wherein the signed logged usage data received from the hearing device is admitted to the data lake without verifying the signature, with the signature of signed logged usage data being verified when the signed logged usage data is retrieved from the data lake for processing.

15. A system for collecting usage data of hearing devices, comprising a plurality of hearing devices, each configured to store a key, which is a secret asymmetric private key or a secret shared symmetric key, on the hearing device;

log data related to a usage of the hearing device and store the logged usage data on the hearing device;

sign the stored logged usage data, using the key stored on the hearing device;

transmit the signed stored logged usage data from the hearing device to a data lake implemented on a data storage and processing unit separate from the hearing device; and the data storage and processing unit configured to verify a signature of the signed logged usage data received from the hearing device by using a public key that corresponds to the private key stored on the hearing device or by using a secret shared symmetric key corresponding to the shared secret symmetric key stored on the hearing device; and process the signed logged usage data if the signature is verified.

* * * * *